(12) United States Patent
Holtslag

(10) Patent No.: US 6,424,102 B1
(45) Date of Patent: Jul. 23, 2002

(54) CATHODE RAY TUBE OF THE INDEX TYPE

(75) Inventor: Antonius H. M. Holtslag, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/466,407

(22) Filed: Dec. 17, 1999

(30) Foreign Application Priority Data

Dec. 21, 1998 (EP) .............................. 98204379

(51) Int. Cl.[7] .................................. G09G 1/04
(52) U.S. Cl. ................ 315/370; 315/364; 348/286
(58) Field of Search ........................ 315/364, 369, 315/370, 366; 348/365, 326, 284, 286, 288

(56) References Cited

U.S. PATENT DOCUMENTS 3,536,823 A   10/1970  Goode et al. ............... 348/811
4,635,107 A * 1/1987  Turner ....................... 348/812
6,211,628 B1 * 4/2001  Harris et al. ................ 348/742
6,281,947 B1 * 8/2001  Teter et al. .................. 343/742

FOREIGN PATENT DOCUMENTS

| EP | 0172722 A1 | 2/1986 |
| FR | 1047878 | 12/1953 |
| GB | 2122415 A | 1/1984 |

* cited by examiner

*Primary Examiner*—Don Wong
*Assistant Examiner*—Ephrem Alemu

(57) ABSTRACT

A picture display device comprising a cathode ray tube of the index type has two patterns of index elements which are electrically separated and each generate separate signals. A first pattern, which is preferably positioned at the blind edge of the display screen, can detect large-scale and, hence, low-frequency disturbances. A second pattern, which preferably extends in the visible part of the display screen, can detect high-frequency disturbances.

16 Claims, 5 Drawing Sheets

CATHODE RAY TUBE OF THE INDEX TYPE

BACKGROUND OF THE INVENTION

The invention relates to a picture display device comprising a cathode ray tube having means for generating one or more electron beams, a display screen, and means for deflecting the electron beams across the display screen, the display screen being provided with index elements and the picture display device comprising receiving means for receiving signals generated by the index elements, and means for controlling the deflection and/or shape of the electron beam(s) in response to the signals.

Picture display devices of this type are known and are usually referred to as "index" display devices or display devices of the "index" type. As compared with the conventional picture display device, in which the cathode ray tube is provided with a color selection electrode (also referred to as shadow mask), such picture display devices have the advantage that, due to the absence of the shadow mask, they have a smaller weight, while the required energy is lower and the sensitivity to vibrations and temperature differences is reduced. This is offset by the fact that, due to the absence of a shadow mask, the sensitivity to disturbing effects of magnetic fields, including the earth's magnetic field, is much greater and that much more stringent requirements are imposed on the accuracy with which the beams are deflected and generated.

The principle of the "index" display device is based on the fact that, to obviate the above-mentioned drawbacks, the display screen is provided with index elements with which the position and/or the shape of the electron beam(s) can be controlled while they are being deflected across the display screen, which control data are used to correct the deflection and/or the shape of the electron beams. However, the problems caused during this control have hitherto been of such a nature that, in spite of the intrinsic advantages of the design, index display devices are not practical alternatives to the conventional designs.

BRIEF SUMMARY OF THE INVENTION

It is an object of the invention to provide an improved picture display device of the type described in the opening paragraph.

To this end, a picture display device according to the invention is characterized in that the display screen comprises a first and a second pattern of index elements of conducting material, which elements are electrically separated, and the picture display device is provided with a first coupling between the first pattern and the receiving means and a second coupling between the second pattern and the receiving means.

In the known picture display devices of the index type, a pattern is used to generate index signals. The display device according to the invention comprises a first and a second pattern of index elements which are electrically separated. Consequently, two signals can be generated.

The invention is based on the following recognition.

Deviations from the "ideal" position or shape of the electron beam(s) may have many causes, for example, influences of the earth's magnetic field, low-frequency interference such as, for example, the mains (50 or 60 Hz), stray fields of neighboring electric apparatuses, interference with the video frequency, etc., etc. The low-frequency interferences generally cause interferences becoming manifest in relatively large offsets of the picture as a whole (for example, frame offsets or barrel-shaped distortions of the displayed picture). The high-frequency interferences cause many smaller deviations which become manifest in small deviations of the position of the electron beam on the screen. These deviations mainly cause color deviations because, locally, an electron beam partly impinges on a phosphor element of the "wrong" color. The display device according to the invention comprises a first and a second pattern of conducting index elements. During operation, a first and a second signal are generated thereby. These signals may be used for compensating interferences which are lower or higher than a given frequency. The given frequency is preferably the line frequency. The first coupling preferably comprises an electric filter for passing signals below a given frequency, and the second coupling preferably comprises an electric filter for passing electric signals above a given frequency. The frequency below which and above which electric signals are passed are preferably approximately equal. Crosstalk between the signals is thereby prevented.

The "low-frequency" index patterns, couplings, receiving means, signals, etc. will hereinafter be referred to as "DC" index patterns, couplings, receiving means, signals, etc., and the "high-frequency" ones will be referred to as "AC".

Since a first and a second index pattern are provided, deviations can be better compensated, and with less energy. During operation, the first index pattern (the "DC" pattern) generates a signal which indicates frame distortions, frame offsets, frame rotations and other large-scale disturbances. This "DC" signal is applied to the means for receiving signals. The means for receiving signals derive signals therefrom for correcting the large-scale deviations. These signals are preferably applied to the deflection means. Consequently, large-scale deviations can be compensated very accurately. The first pattern preferably extends at least partly beyond a part of the display screen which is visible during operation, and the picture display device comprises means for causing the electron beam(s) to impinge on the part of the first pattern situated beyond the part of the display screen which is visible during operation.

The first pattern then extends at least partly across one or more blind edges (or part(s) of blind edges) around the visible part of the display screen. This provides the possibility of correcting the large-scale disturbances in the picture, even when the displayed picture is black or comprises only a small number of illuminated parts. A correction of high-frequency deviations can then be performed much better.

The first pattern preferably comprises a sub-pattern at least in each corner of the display screen. This provides the possibility of measuring differences between the corners, while frame offsets and rotations can be measured and therefore compensated. These sub-patterns preferably extend at least along a side (viewed from the corner) over a length of 20% of the length of the side. This provides the possibility of accurately measuring and thus correcting also barrel or pincushion distortions of the frame.

In addition to corner sub-patterns, a further preferred embodiment comprises sub-patterns along at least two sides of the display screen.

The first pattern preferably comprises means for determining the position of the electron beam in two mutually perpendicular (x and y) directions.

These and other aspects of the invention are apparent from and will be elucidated with reference to the embodiments described hereinafter.

BRIEF DESCRIPTION OF THE SEVERAL VIEWS OF THE DRAWING

The Figures are not drawn to scale. Generally, identical components are denoted by the same reference numerals in the Figures.

DETAILED DESCRIPTION OF THE INVENTION

Figure 1:
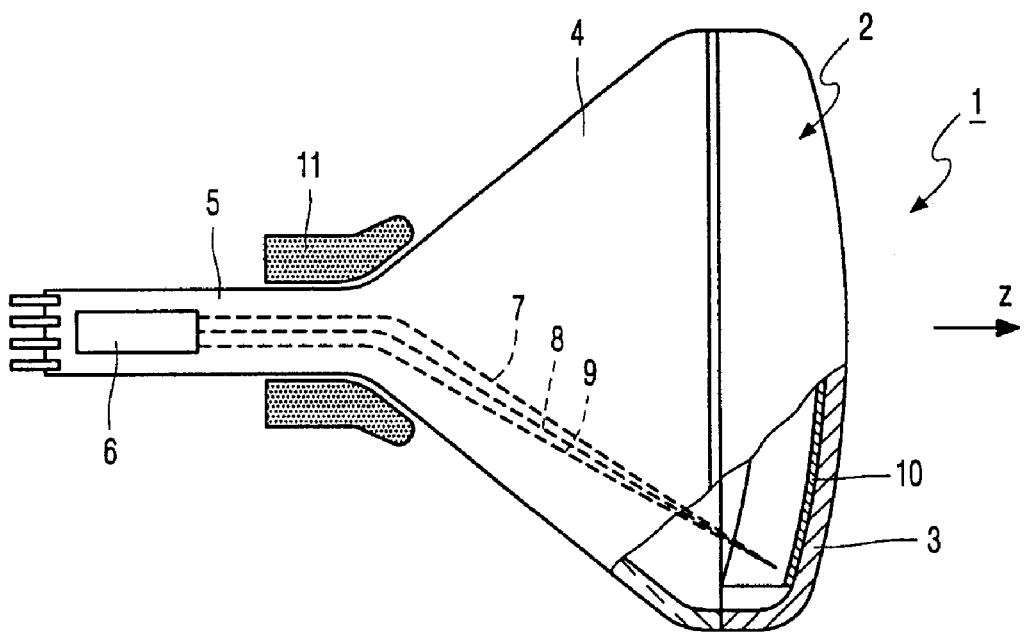
FIG. 1 shows diagrammatically a cathode ray tube.

The cathode ray tube shown in FIG. 1 is a color cathode ray tube 1 having an evacuated envelope 2 comprising a display window 3, a cone 4 and a neck 5. The neck 5 accommodates an electron gun 6 for generating three electron beams 7, 8 and 9 extending, in this embodiment, in one plane, the in-line plane. A display screen 10 is situated on the inner side of the display window 3. The display screen 10 comprises a plurality of red, green and blue-luminescing phosphor elements. Each group of (red, green or blue) phosphor elements forms a pattern. The display screen may alternatively comprise other patterns such as a black matrix (a black pattern) or color filter patterns. Moreover, patterns are provided with index elements in cathode ray tubes of the index type. On their way to the display screen 10, the electron beams 7, 8 and 9 are deflected across the display screen 10 by means of a deflection unit 11.

Figure 2:
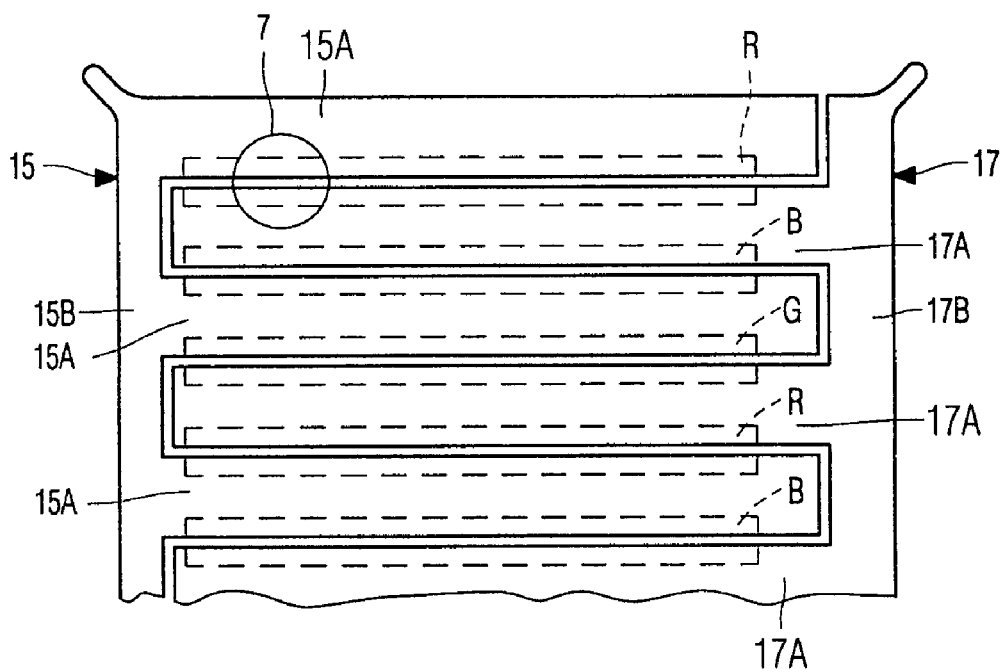
FIG. 2 shows diagrammatically a detail of a known picture display device.

FIG. 2 shows diagrammatically a detail of a known picture display device, in this embodiment, a display device known from British patent application GB 2 122 415 A. Two electrodes 15 and 17 each partly overlap phosphor elements R, B and G. An electron beam 7 which impinges on, for example, phosphor element R will also impinge on electrodes 15 and 17. The electrodes have fingers 1SA and 17A and connection pieces 15B and 17B for electrically interconnecting the fingers 15A, 17A. When the electron beam evenly impinges on electrodes 15 and 17, there will be no potential difference between these electrodes. These electrodes comprise transparent electrically conducting materials such as ITO (indium tin oxide) or ATO (antimony-doped indium tin oxide). When the electron beam is shifted upwards or downwards, more electrons will impinge on one of the electrodes than on the other and a potential difference and/or a difference of current through the electrodes will occur between these electrodes. This difference can be measured and used for correcting the position of the electron beam. Problems are created because the correction must always be effected at a later stage, requires much energy and, if the displayed picture has many black spots (or is completely black), no difference can be measured and deviations may easily occur.

Figure 3:
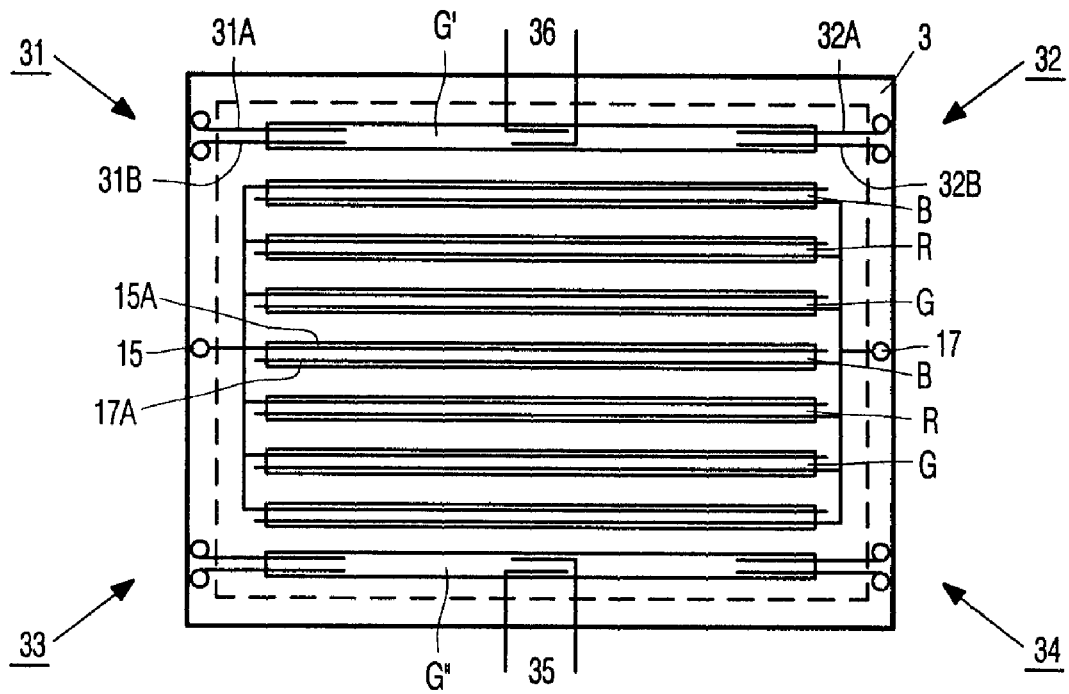
FIG. 3 shows diagrammatically a detail of a picture display device according to the invention.

As shown from FIGS. 1–3, there is a multiplicity of fingers 15A and 17A which are interdigitated, and the beam 7 will produce a differential electric signal between the electrodes 15 and 17.

FIG. 3 shows diagrammatically a detail of a picture display device according to the invention. The picture display device comprises phosphor elements (in this embodiment, red (R), green (G) and blue (B) phosphor elements) on a display window 3, and two electrodes 15 and 17 which, likewise as in FIG. 2, have fingers 15A, 17A. In addition to electrodes 15 and 17, which also form a pattern of electrically conducting index elements, the picture display device comprises a further pattern of conducting index elements, which pattern comprises sub-patterns 31, 32, 33 and 34. In a simple embodiment, each sub-pattern comprises two electrodes 31A and 31B. In this embodiment, the sub-patterns 31, 32, 33 and 34 are laid on green phosphor elements G' and G". In this embodiment, these green phosphor elements extend beyond the visible part of the display screen. These further sub-patterns are electrically separated from the pattern of index elements comprising electrodes 15 and 17. Similar sub-patterns may extend across blue and red phosphor elements. Low-frequency disturbances (caused, for example, by the earth's magnetic field or the mains) can be detected and corrected with the aid of the sub-patterns 31, 32, 33 and 34 of index elements. Frame errors (such as, for example, offsets, rotations and/or barrel or pincushion distortions of the frame) can be detected with the aid of this further pattern by difference signals between the electrodes 31A, 31B, etc. In a preferred embodiment, the picture display device also comprises patterns 35 and 36 which are positioned along at least two sides of the display screen, preferably approximately in the center of the relevant side. This provides the possibility of following the course of a frame error along one side. This may notably be important for barrel or pincushion distortions of the picture. Signals for correction of these relatively large-scale errors in the picture may be obtained from these signals. The sub-patterns preferably extend at least partly beyond the visible part of the display screen. This provides the possibility of correcting at least the large-scale deviations, even when the displayed picture is entirely or largely black for a longer period of time, for example, during night shots, or for CMTs (computer monitors) when these have functioned in the standby mode for a longer period of time. The deviations in the picture thus remain relatively small. Consequently, the high-frequency measuring signals and correction signals remain relatively small, which saves energy and allows an improved correction.

Figure 4:
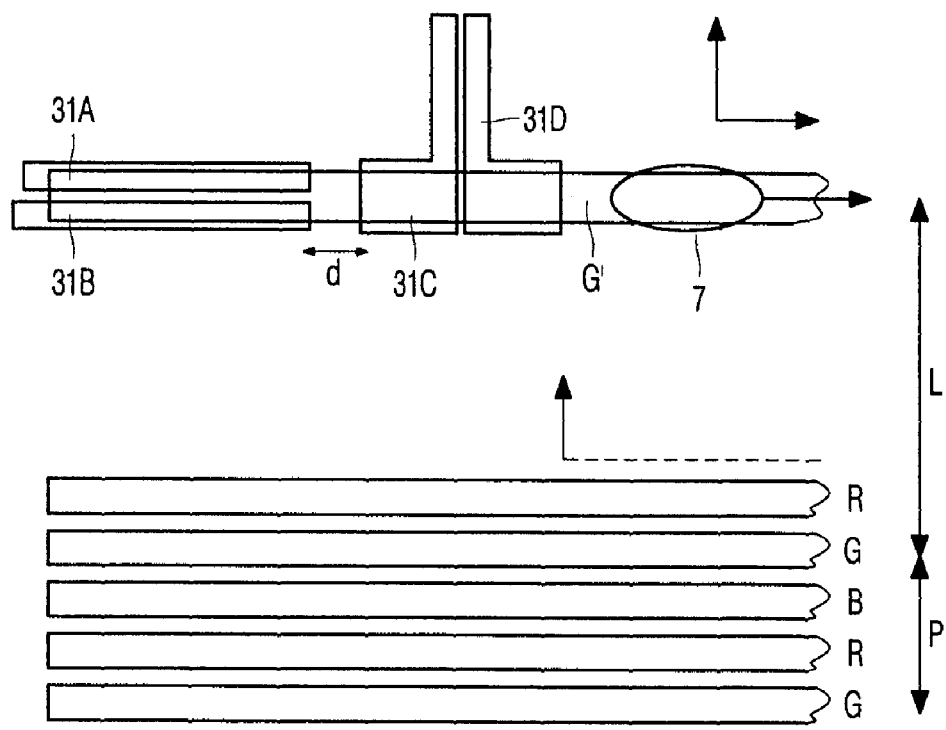
FIG. 4 shows diagrammatically a detail of a further embodiment of the picture display device according to the invention.

FIG. 4 shows a further preferred embodiment of the invention. In this embodiment, sub-pattern 31 comprises electrodes 31A and 31B, and also electrodes 31C and 31D (at some distance d from the electrodes 31A and 31B). The electrodes 31A and 31B define the y position of electron beam 7, and the electrodes 31C and 31D provide the possibility of defining the x position of the electron beam 7. The electrodes 31A, 31B and 31C, 31D are separated through a distance d. This distance prevents crosstalk and provides the possibility of determining the scanning velocity v. It is also possible to determine the focusing, i.e., the shape of the spot of the electron beam 7. The variation of the signals of electrodes 31C and 31D is a measure of the size of the spot (see FIG. 9). The sub-patterns are preferably situated at a distance L, where $L \leq 2p$, where p is the phosphor pitch of the pattern of index elements comprising electrodes 15, 17. This distance separates the patterns electrically and prevents crosstalk between the two patterns of index elements. In this embodiment, the further pattern comprises four sub-patterns in the corners of the display window. By virtue of its simplicity, this is a preferred embodiment. If desired, as may notably be useful if barrel or pincushion distortions of the picture must be corrected, the further pattern comprises one or more sub-patterns which are preferably positioned in a center of one side of the display window. It is to be noted that measurements are performed on and for the "green" electron beam in this embodiment. Similar patterns may be provided for the red and/or blue electron beams, or solely for one of these electron beams.

Figure 5:
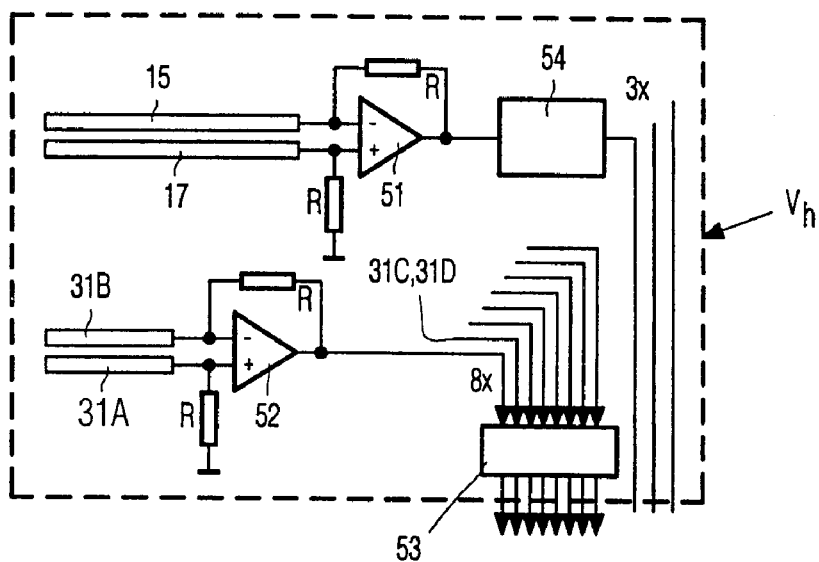
FIG. 5 shows diagrammatically a measuring circuit for a picture display device according to the invention.

FIG. 5 shows diagrammatically a circuit for measuring the position of the electron beam. Amplifier 51 amplifies the difference signal between the electrodes 15 and 17, amplifier 52 amplifies the difference signal between electrodes 31A and 31B. Amplifiers are also provided for electrode pairs 31C, 31D, 32A, 32B, etc. Similarly, amplifiers may be provided for the "blue" and "red" electron beam electrodes. Signals which are representative of the position and/or shape of the electron beam(s) are generated by the amplifiers. These signals are superimposed on the high voltage applied to the electrodes 15, 17, 31A, 31B, etc. These electrodes are present on the display screen, which is generally at a very high voltage (25–30 kV), diagrammatically denoted by $V_h$ in FIG. 5. It is difficult and potentially hazardous to perform measurements on such high voltages. The cathode ray tube therefore preferably comprises means 53 and/or 54 for converting a high-voltage signal into a low-voltage signal.

Figure 6A:
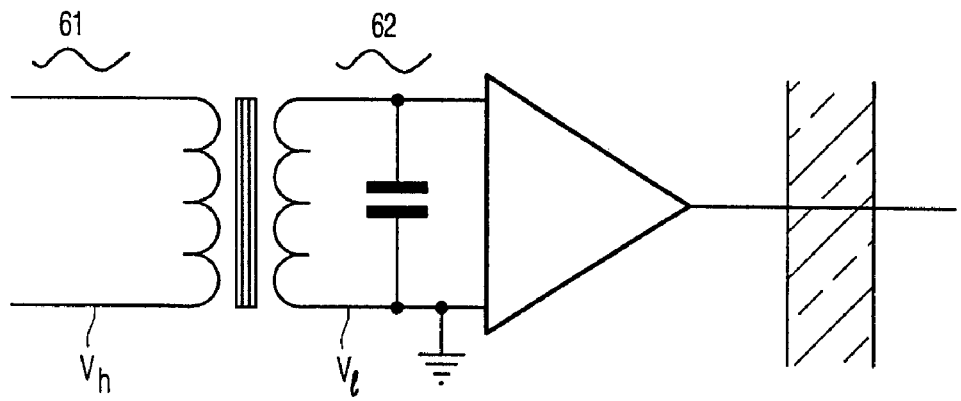
FIGS. 6A and 6B show diagrammatically two means for converting high-voltage signals to signals at a lower voltage.
Figure 6B:
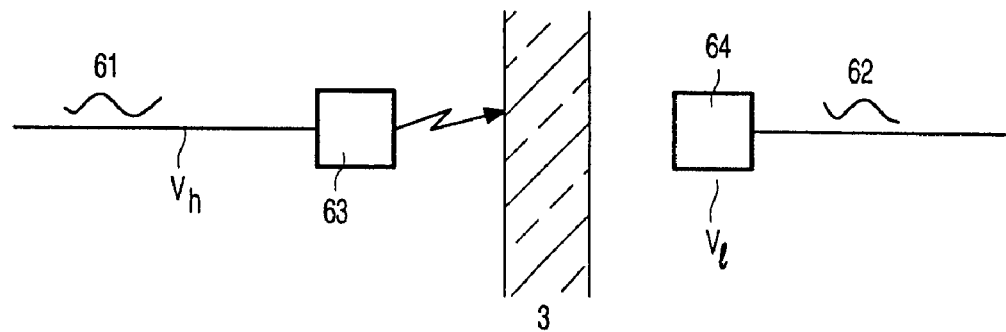

FIGS. 6A and 6B show two embodiments of such means. In FIG. 6A, a signal 61 at a high voltage $V_h$ is transformed via a transformer to a signal 62 at a lower voltage $V_l$. This may be a magnetic transformer (inductive voltage transfer) or an electric transformer (capacitive voltage transfer). Such a signal transfer (also referred to as "level shifter") is generally more effective as the frequency of the signal 61 increases, and means as illustrated in FIG. 6A are therefore preferred for use with high-frequency signals, i.e. means 54. The low-voltage signal 62 can now be removed from the cathode ray tube.

In FIG. 6B, a light signal, denoted by an arrow in FIG. 6B, is generated by an electro-optical transducer 63 as a consequence of signal 61 which is at a high voltage $V_h$. This light signal is passed through the transparent envelope and detected by means 64 on the outer side of the cathode ray tube, and converted into a signal 62 at a low voltage $V_1$. The means shown in FIG. 6B are notably suitable for relatively low-frequency signals and are therefore preferred for means 53. The circuit may be provided with a low-pass filter for obstructing high-frequency signals (which can be removed from the display screen, for example, by stray light).

Figure 7:
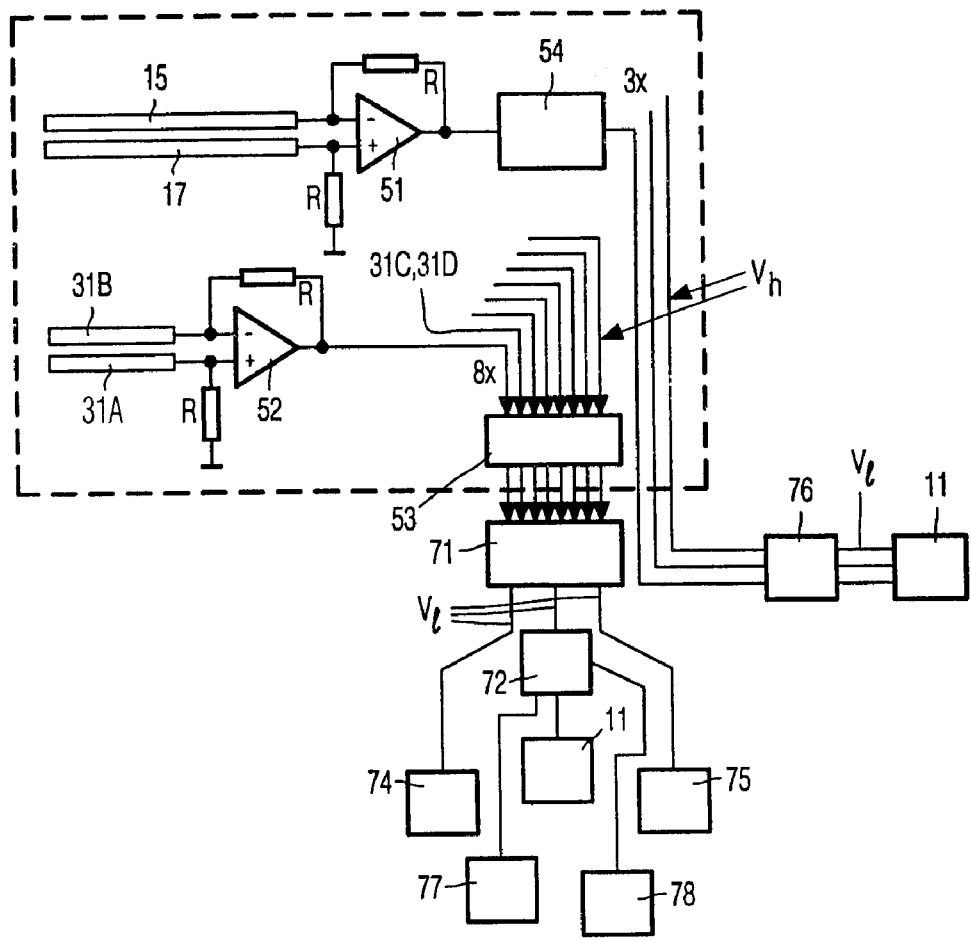
FIG. 7 shows a feedback circuit in which the signals of the index elements are ed back.
Figure 8:
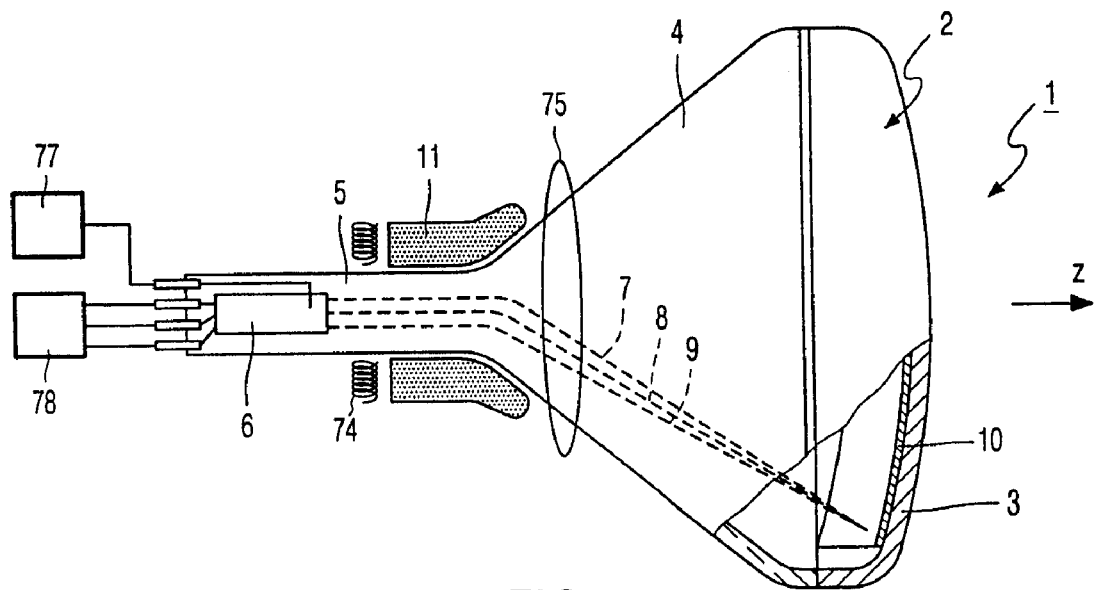
FIG. 8 shows diagrammatically, by way of example, how a plurality of signals is fed back with elements of the picture display device.

FIG. 7 illustrates diagrammatically a possible drive of the coils and other means. The signals from means 53 are applied to a microprocessor 71. In this microprocessor, the signals are compared with calibration signals, and drive signals are generated. Dependent on the measured deviations, drive signals may be sent to the drive means 72 of the deflection coils 11. It is alternatively possible to drive other means, for example, means 74 and 75 for generating magnetic quadrupoles and magnetic sixpoles or higher-order poles, or a magnetic field in the z direction (see FIG. 8). A magnetic field in the z direction may be generated by an annular coil 75 around the tube. Such a field may compensate a rotation of the picture. A quadrupole field may be generated by four electromagnets 74 positioned around the tube, around the neck 5. Such a field allows compensation of distortions of the picture and/or of the spot shape. Moreover, signals may be generated which are applied to a focusing electrode 77 of the electron gun and to the cathodes 78 of the electron gun.

Figure 9:
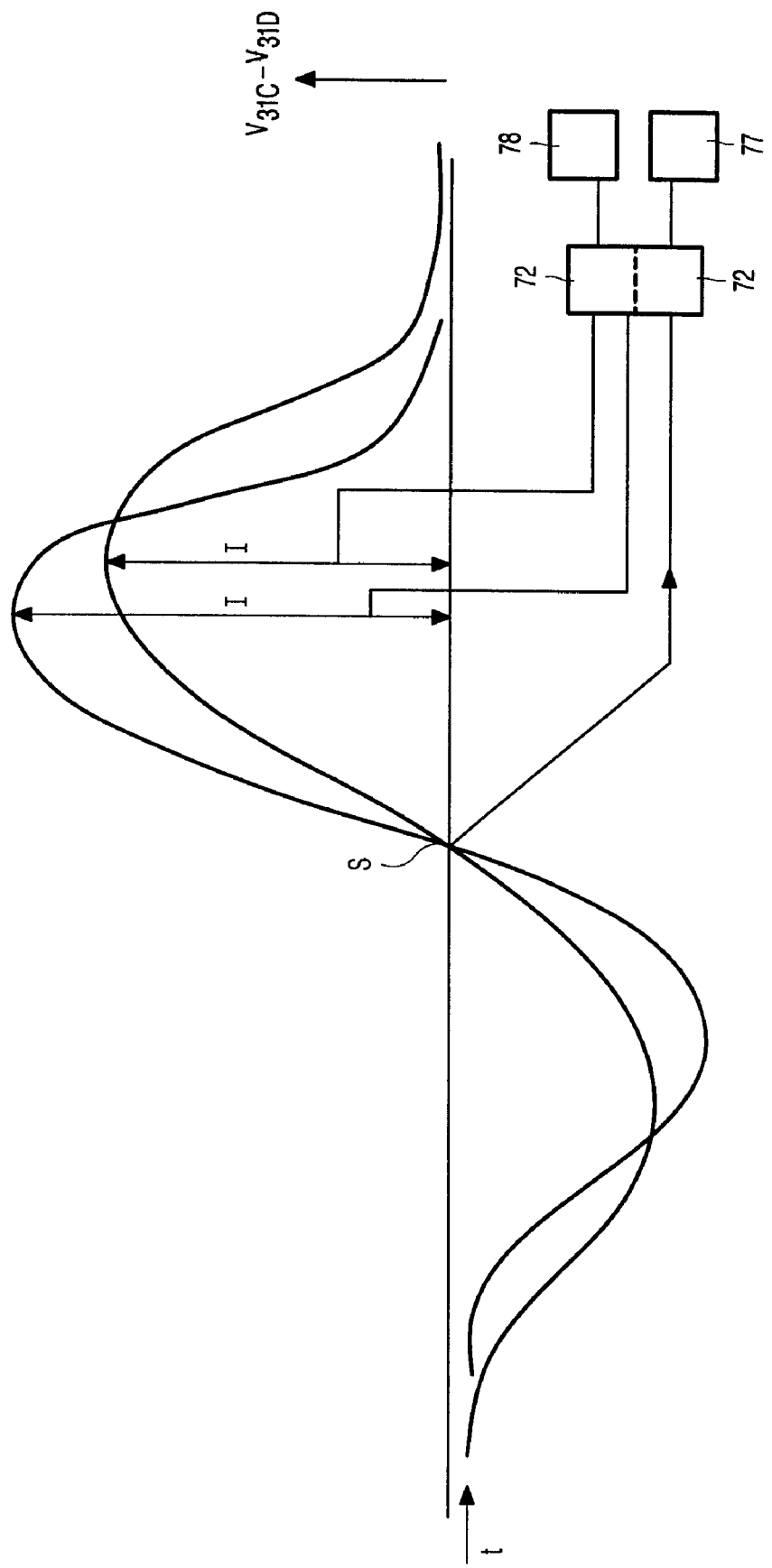
FIG. 9 illustrates diagrammatically a voltage difference.

FIG. 9 illustrates diagrammatically the variation of the voltage difference (or difference of applied current) $V_{31C}-V_{31D}$ at patterns 31C and 31D as a function of time. The slope S of the curve round the zero-crossing is representative of the size of the spot. The smaller the spot, the steeper the curve. The size of the spot can be derived from the slope, and this can be compared with a desired slope. This comparison may be used for calculating a signal which is applied to a focusing electrode 77. This is shown diagrammatically in FIG. 9. The intensity I is a measure of the intensity of the electron beam. This measure may be used for deriving signals which are applied to one or more cathodes 78 of the electron gun.

The high-frequency signal from means 54 is converted in a means 76 into a video signal, i.e. a signal having a frequency which is comparable with video frequencies 30 applied to the deflection coils 11 for compensating high-frequency deviations. The means 11 (deflection unit), 74 (magnets for quadrupole and higher multipoles) and 75 (coil for generating anti-rotation field) constitute means which, in response to the signals from the receiving means 71, 76, receive signals from the index elements and generate or modify magnetic fields, while the means 77 (focusing electrode) and 78 (cathodes) generate or modify electric fields.

It will be evident that many variations are possible within the scope of the invention.

In summary, a picture display device is described, comprising a cathode ray tube of the index type having two patterns of index elements which are electrically separated and each generate separate signals. A first pattern, which is preferably positioned at the blind edge of the display screen, can detect large-scale and, hence, low-frequency disturbances. A second pattern, which preferably extends in the visible part of the display screen, can detect high-frequency disturbances.

What is claimed is:

1. A picture display device comprising:
   a cathode ray tube having means for generating one or more electron beams, a display screen provided with index elements, and means for deflecting the electron beams across the display screen,
   receiving means for receiving signals generated by the index elements, and
   response means for controlling the deflection and/or shape of the electron beam(s) in response to the signals,
   characterized in that
   the display screen comprises a first pattern comprising two first-pattern index elements of conducting material which are spaced from each other and electrically separated, and a second pattern comprising two second-pattern index elements of conducting material which are spaced from each other and electrically separated, and
   the picture display device is provided with a first coupling between the first pattern and the receiving means, and
   a second coupling between the second pattern and the receiving means.

2. A picture display device comprising:
   a cathode ray tube having means for generating one or more electron beams, a display screen provided with index elements, and means for deflecting the electron beams across the display screen, receiving means for receiving signals generated by the index elements, and response means for controlling the deflection and/or shape of the electron beam(s) in response to the signals, characterized in that:

the display screen comprises a first and a second pattern of index elements of conducting material, which elements are electrically separated, the first pattern extends at least partly beyond a part of the display screen which is visible during operation, and the picture display device comprises:

a first coupling between the first pattern and the receiving means, a second coupling between the second pattern and the receiving means, and means for causing the electron beam(s) to impinge on the part of the first pattern situated beyond the part of the display screen which is visible during operation.

3. The picture display device as claimed in claim 2, characterized in that the first pattern comprises a sub-pattern at least in each corner of the display screen.

4. The picture display device as claimed in claim 3, characterized in that the first pattern also comprises sub-patterns along at least two sides of the display screen.

5. The picture display device as claimed in claim 1, characterized in that the response means comprises means for generating or modifying magnetic fields.

6. The picture display device as claimed in claim 1, characterized in that the response means comprises means for generating or modifying electric fields.

7. The picture display device as claimed in claim 1, characterized in that the first coupling couples a first differential signal, and the second coupling couples a second differential signal.

8. The picture display device as claimed in claim 1, characterized in that the first coupling couples frequencies below a given frequency, and the second coupling couples frequencies above said given frequency.

9. The picture display device as claimed in claim 1, characterized in that said second pattern comprises two electrodes, one of said electrodes comprising a plurality of fingers and the other of said electrodes comprising a plurality of fingers interdigitated with the fingers of the one of said electrodes.

10. The picture display device as claimed in claim 9, characterized in that said one and said other of said electrodes each comprise a multiplicity of respective interdigitated fingers.

11. The picture display device as claimed in claim 10, characterized in that the first coupling couples frequencies below a given frequency, and the second coupling couples frequencies above said given frequency.

12. The picture display device as claimed in claim 2, characterized in that the first coupling couples a first differential signal, and the second coupling couples a second differential signal.

13. The picture display device as claimed in claim 2, characterized in that the first coupling couples frequencies below a given frequency, and the second coupling couples frequencies above said given frequency.

14. The picture display device as claimed in claim 2, characterized in that said second pattern comprises two electrodes, one of said electrodes comprising a plurality of fingers and the other of said electrodes comprising a plurality of fingers interdigitated with the fingers of the one of said electrodes.

15. The picture display device as claimed in claim 14, characterized in that said one and said other of said electrodes each comprise a multiplicity of respective interdigitated fingers.

16. The picture display device as claimed in claim 15, characterized in that the first coupling couples frequencies below a given frequency, and the second coupling couples frequencies above said given frequency.

* * * * *